Patented Aug. 15, 1933

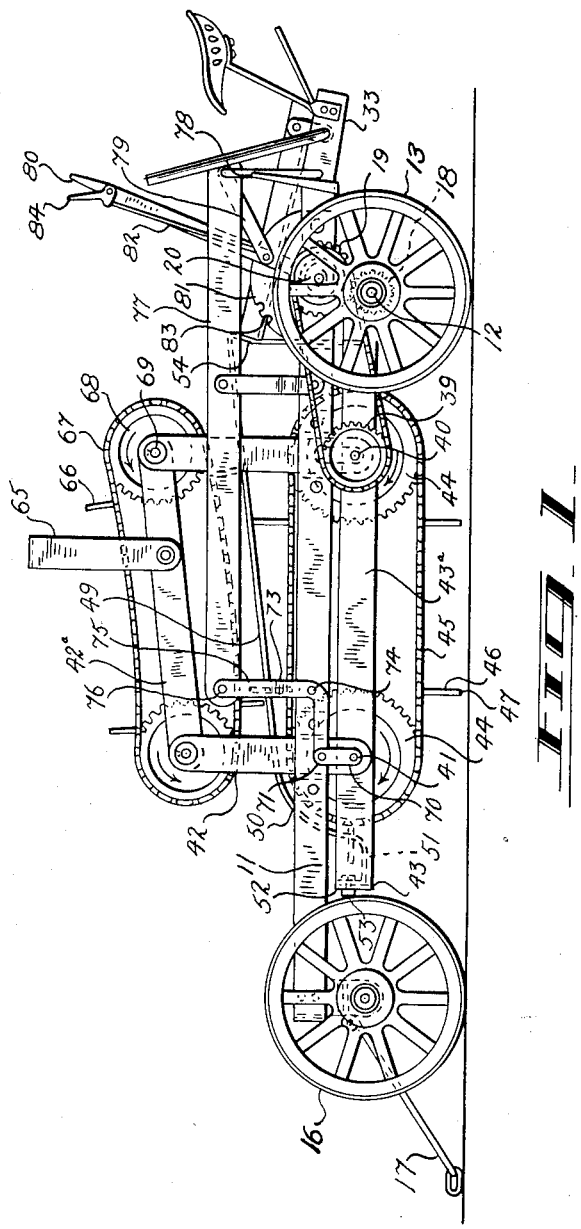

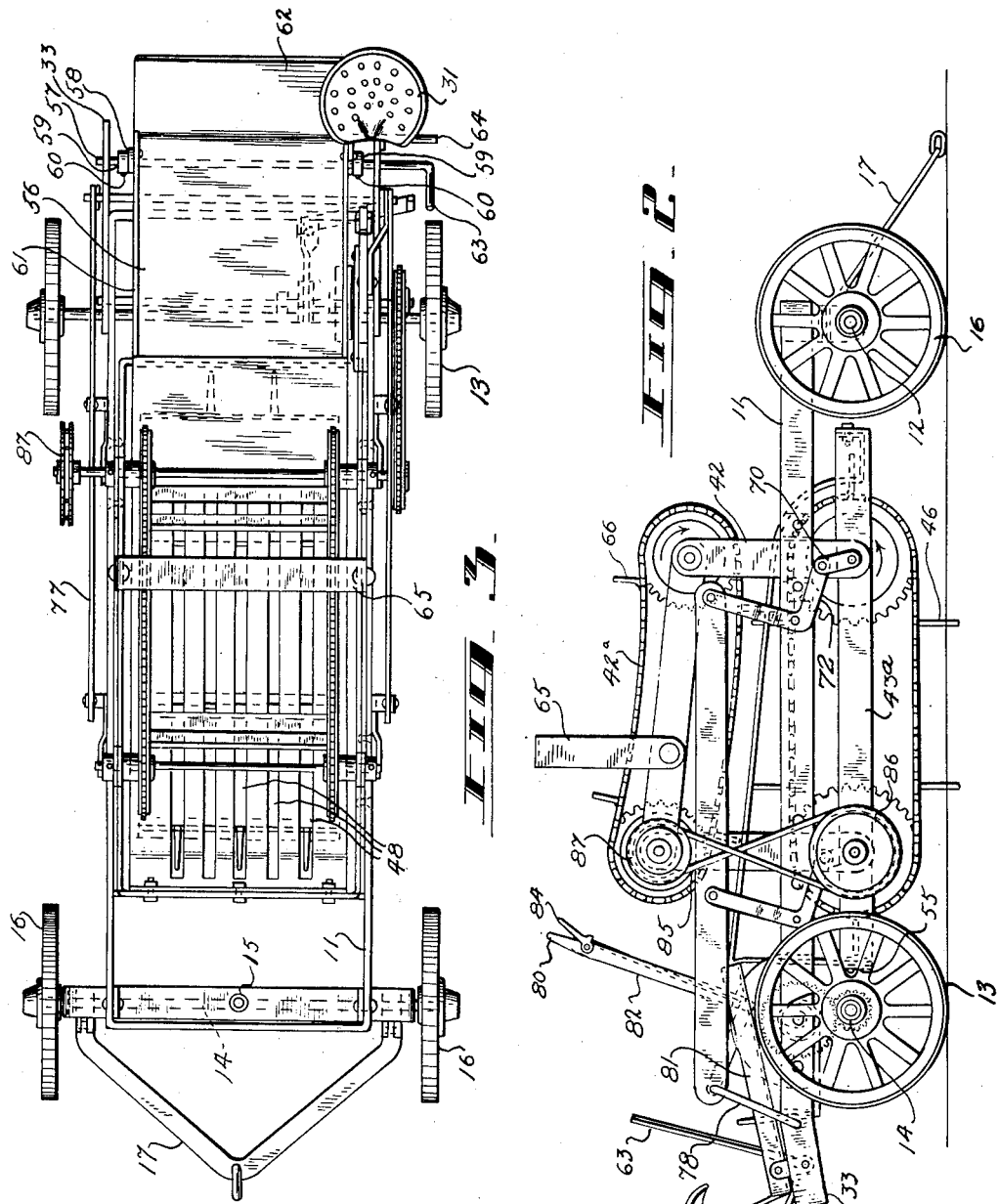

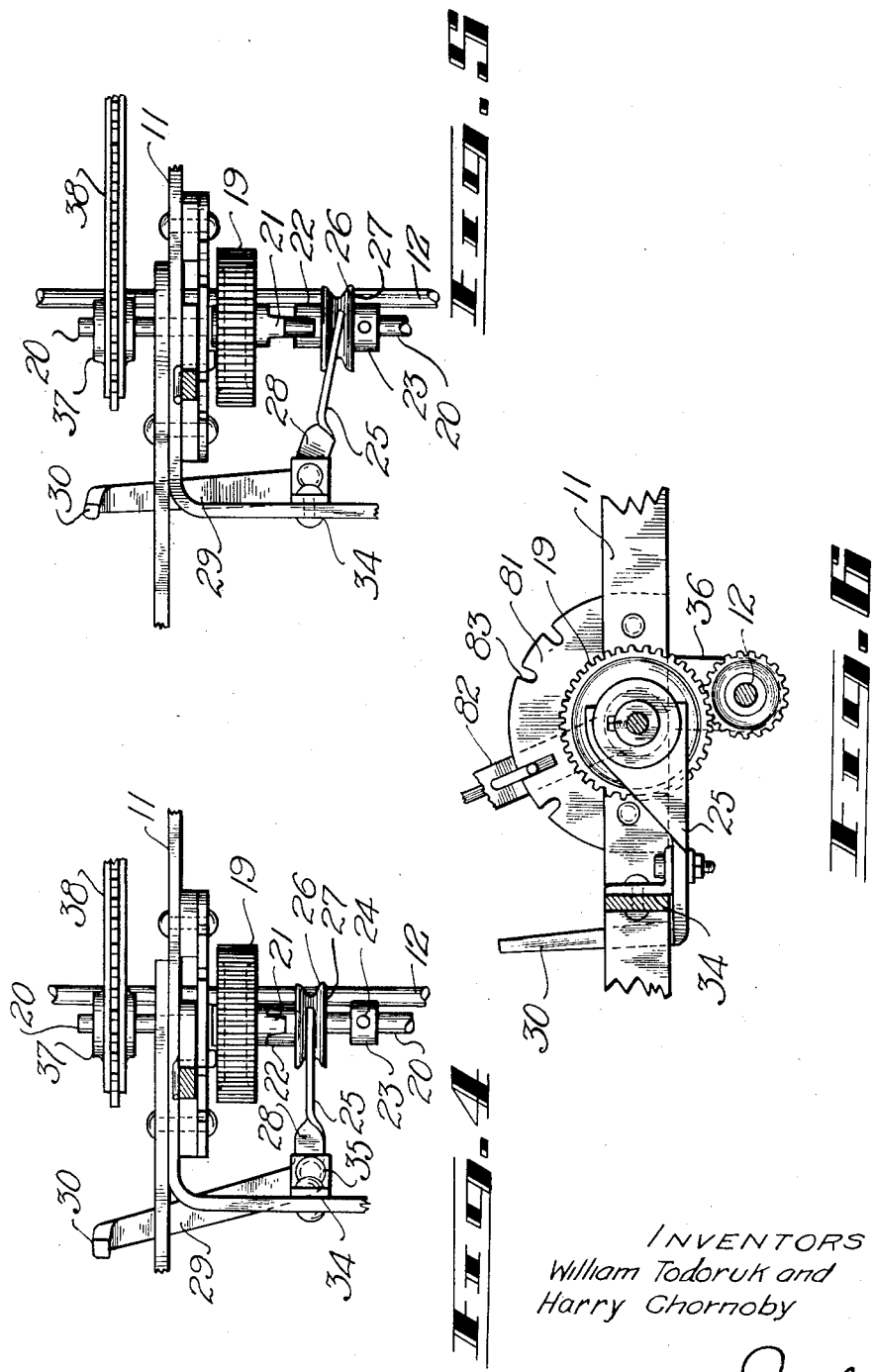

1,922,873

UNITED STATES PATENT OFFICE 1,922,873

REVOLVING HARROW AND WEEDER

William Todoruk and Harry Chornoby, Calgary, Alberta, Canada

Application March 23, 1932. Serial No. 600,738

4 Claims. (Cl. 97—10)

This present invention relates to certain new and useful improvements in a revolving harrow and weeder.

The primary object of the invention resides in the provision of a revolving harrow and weeder of simple and inexpensive construction and one which is highly efficient in use.

The invention has for another object the provision of a revolving harrow and weeder which serves to harrow the ground and at the same time clear the soil of weeds, roots and the like.

The invention has for a further object the provision of a revolving harrow and weeder of the character stated which is entirely automatic in its operation with all of the operative parts driven by power derived from one of the shafts carrying the ground wheels.

The invention has for a still further object the provision of a revolving harrow and weeder of the character stated in which the harrow teeth serve to harrow the ground and also extract from the soil, weeds, roots and the like and deliver them onto a conveyor which in turn delivers them to a dumping tray, from which they may be dumped as desired.

The invention has for a still further object the provision of a revolving harrow and weeder of the character stated which may be readily adjusted to raise and lower the harrow mechanism and the parts co-operating therewith, with respect to the main frame to assure efficient operation of the machine.

The invention has for a still further object the provision of a revolving harrow and weeder of the character stated in which all of the operative parts are under the control of the operator located on the machine so that the operative parts may be readily adjusted as desired, means also being included to connect the operative parts with the driving axle or disconnect said operative parts from the driving axle, as desired.

The invention has for a still further object the provision of a revolving harrow and weeder of the character stated which is composed of the minimum number of parts of simple and inexpensive construction and simple operation, with the complete machine designed so that it may be manufactured at small cost and retailed at a popular price with good profit, thus providing a commercially attractive proposition.

To the accomplishment of these and related objects as shall become apparent as the description proceeds, our invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 1 is a side elevation of the complete machine, with the operative parts mounted on the main frame raised to inoperative position for transportation of the machine without danger of engagement of the harrow teeth in the soil;

Figure 2 is a side elevation, looking at the opposite side of the machine and showing the operative parts lowered on the main frame to operative position for engagement of the harrow teeth in the soil;

Figure 3 is a plan view of the machine;

Figure 4 is a fragmentary detail plan on an enlarged scale with parts broken away and the raising and the lowering lever shown in horizontal section, this view disclosing clearly the clutch mechanism with the clutch in operative or engaged position;

Figure 5 is a view similar to Figure 4 showing the clutch in open or disengaged position; and Figure 6 is a fragmentary detail elevation, showing clearly the raising and lowering lever.

Referring more in detail to the drawings, it will be noted that the combined revolving harrow and weeder includes a rectangular main frame 11 which is supported on the rear drive axle 12 having the rear wheels 13 rigid on its opposite end. This main frame 11 also has its forward end extended over the front or forward axle 14, mounted centrally on the king pin 15 and having the forward ground wheels 16 rotatably mounted on its opposite ends, an appropriate draft attaching means 17 being extended from the forward axle 14. A drive gear 18 is rigid on the rear axle 12 and meshes with and drives a gear wheel 19 which is normally loose on a power transmitting shaft 20 mounted transversely in the main frame 11, above the rear axle 12 and preferably slightly to the rear thereof. Rigid with one face of the gear wheel 19 is a clutch member 21 adapted to be engaged by and locked with a sliding clutch member 22 which is keyed on the power transmitting shaft 20 for sliding movement therewith as well as rotation with the shaft 20, movement of the sliding clutch member 22 away from the clutch member 21 being limited by the stop collar 23 which is secured in adjusted position on the shaft 20 by a set screw 24 or other appropriate means. The sliding clutch member 22 is moved to its operative and inoperative positions to lock the clutch member 21 and gear wheel 19 for rotation with the shaft 20 or release said clutch member 21 and gear wheel 19, by means of a bifurcated clutch actuating bar 25 loosely engaged in the annular groove 26 in the enlarged portion 27 of the sliding clutch member 22. This clutch actuating bar 25 has a turned or twisted end 28 which is rigidly connected with the angularly extended bar 29 having its free outer end turned upwardly to serve as the clutch control lever 30, extending upwardly along the outside of the main frame 11, adjacent the operator's seat 31 provided on the upstanding standards 32 at the rear end of the main frame and preferably supported on an extension bar 33 projecting rearwardly and slightly downwardly from one rear corner of the main frame 11. An angular bracket 34 is carried by the rear end of the main frame 11 to support the fulcrum member 35 extended through the horizontal angle thereof and through the bars 28 and 29 at the point of connection of said bars 28 and 29, thus serving as the fulcrum bolt 35 on which the clutch controlling mechanism operates. It may also be stated at this time, that the downturned forward ends 36 of the main frame extension bars 33 serve as bearings in which the opposite end portions of the rear axle 12 rotate. Attention may likewise be directed at this time, that a sprocket wheel 37 is mounted rigidly on an extended end of the power transmitting shaft 20, outwardly of one side of the main frame 11.

Operating around the sprocket wheel 37 is a sprocket chain 38 which also operates around and drives the small sprocket wheel 39 carried rigidly on the rear harrow shaft 40 and at one extended end thereof. This rear harrow shaft 40 and the forward harrow shaft 41 are rotatably mounted respectively in the rear and forward lower corners of the rectangular upstanding floating side frames 42 arranged for vertical adjustment or raising and lowering within the main frame 11. These frames 42 are mounted at their lower sides on the longitudinal frame members 43a of the vertically adjustable horizontal rectangular frame 43 extended beneath the main frame 11 and slightly narrower than the latter and also considerably shorter than said main frame 11. Mounted on the shafts 40 and 41, inwardly of the frame 43, are the comparatively large sprocket wheels 44, near either end of the shafts 40 and 41 and operating around said sprocket wheels 44, are the pair of sprocket chains 45 for the harrow having transverse bars 46 with harrow teeth 47 arranged in spaced relation on the outer face thereof, preferably along one longitudinal edge. These harrow teeth 47 serve to harrow or cultivate the ground when the frames 42 are lowered and properly adjusted vertically, the harrow teeth 47 also serving to gather from the soil all weeds, roots and the like and carry them upwardly in the frame 43, through the longitudinal slots 48 of the rearwardly inclined runway 49, extending over the endless rotary harrow structure, which latter includes the sprocket chains 45, transverse bars 46 with teeth 47 and the sprocket wheels 44 on the harrow shafts 40 and 41. The inclined runway 49 has its forward end 50 curved downwardly over the forward end of the endless rotary harrow structure with the forward extremity 51 of the inclined runway 49, then turned forwardly and terminating in an upwardly directed portion 52 attached to the inner face of the forward end of the frame 43 by bolts 53 or other appropriate means. After passing completely over the endless rotary harrow structure, the inclined runway 49 has its rear end 54 turned downwardly and slightly forwardly at a sharp angle and then directed downwardly in a substantially vertical plane and secured to the inner face of the rear end of the frame 43 by rivets 55 or other appropriate means.

The weeds, roots and the like gathered by the harrow teeth 47 and delivered onto the rearwardly inclined runway 49 are carried up the same and delivered from the rear end thereof into a dump pan 56 which extends across and rocks on a rock shaft 57 which is adapted to rock in the rear frame extension bars 33 of the main frame 11, suitable bearing brackets 58 being extended in depending relation from the sides of the dump pan 56 and having hollow portions 59 adjustably secured on the rock shaft 57 by set screws 60 or other appropriate means. The dump pan 56 has upstanding side flanges 61 while the rear end 62 is extended and slightly curved upwardly. When the dump pan 56 is in normal position, the forward end thereof is below and opposite the discharge rear end of the rearwardly inclined runway 49 to receive the weeds, roots and the like from the latter. The rock shaft 57 for the dump pan 56 has an operating crank handle 63 provided thereon by turning one extended end thereof, within ready reach of the operator on the operator's seat 31, so that the dump pan 56 may be readily rocked to discharge the weeds, roots and the like from the rear end 62 of the dump pan 56. The crank handle 63 may be also employed for returning the dump pan 56 to its normal or receiving position. A stop member 64 may also be provided and extended outwardly from the side of the main frame extension bar 33 on which the operator's seat 31 is mounted, to be engaged by the crank handle 63 of the rock shaft 57 for limiting rocking movement of the rock shaft 57 and the dump pan 56 when dumping the latter.

The upper longitudinal bars 42a of the frames 42 are also rearwardly inclined corresponding to the degree of incline of the rearwardly inclined runway 49 but above the same, and may be braced by an appropriate transverse brace member 65, and which is shown as being in the form of an inverted U-bar rising to a sufficient height to clear the transverse scraper blades 66 carried on the pair of sprocket chains 67 operating around the sprocket wheels 68 on the forward and rear shafts 69 mounted in the upper corners of the upstanding rectangular floating side frames 42. The scraper blades 66 when travelling on the inclined runway 49 from near the lower forward end thereof to a point near the upper rear end of said inclined runway 49, serve to scrape the weeds, roots and the like upwardly over the inclined runway 49 and into the dump pan 56. It may also be stated at this time that the sprocket wheels 68 rotate in a direction opposite to the direction of rotation of the sprocket wheels 44, thus causing the scraper blades 66 on the lower run of the sprocket chains 67 to move rearwardly and upwardly over the inclined runway 49, as the transverse bars 46 on the upper run of the sprocket chains 45 also move rearwardly, the teeth 47 on said transverse bars 46 projecting for some distance upwardly through the slot 48 when first entering the same and then gradually leaving the slot 48 before reaching the upper end of the rearwardly inclined runway 49 and thus automatically clearing the teeth 47 from the slot 48 and leaving the weeds, roots and the like on the inclined runway 49 to be carried upwardly thereon by the transverse scraper blades 66 moving over said inclined runway 49.

Loosely mounted on each end of each of the continuous revolving harrow shafts 40 and 41 is a short link 70, to the upper end of which is connected by a pivot member 71, one arm 72 of a bell crank lever 73, fulcrumed at its centre on a fulcrum member 74 projecting laterally from one of the longitudinal side frame members of the main frame 11. The upstanding arm 75 of each bell crank lever 73 is pivoted by an appropriate pivot member 76 to the side of an elongated bar 77 at the side of the machine and above the main frame 11. Each bar 77 has its rear end connected to one of the main frame extension bars 33 by a connecting link 78. A rearwardly inclined link 79 has its rear upper end connected with the upper end of one of the links 78 while its lower end is offset inwardly and pivoted to the harrow mechanism raising and lowering lever 80 or main control lever of the machine, intermediate the ends of said lever 80. This main control lever 80 has its lower end fulcrumed on the shaft 20 and operates over a segmental rack 81 with a conventional latch finger 82 carried on the lever 80 serving to automatically lock in the notches 83 provided on the arcuate edge of the segmental rack 81 to automatically lock the main control lever or continuous revolving harrow raising and lowering lever 80 in adjusted or set position. A conventional releasing finger 84 is also provided on the lever 80 and connected with the conventional latch member 82 for releasing the latter from the segmental rack 81 when it is desired to operate or readjust the lever 80 and thus raise or lower the continuous revolving harrow structure, together with the frames 42 and the scraper mechanism supported between the upper portions of said frames 42 and working over the rearwardly inclined runway 49, which latter is also raised and lowered with the frames 42 as well as the lower horizontal frame 43. A crossed drive belt 85 operates around belt wheels 86 and 87 arranged respectively on the rear shaft 40 and on the rear shaft 69 to drive the latter and thus operate the scraper mechanism from the harrow mechanism.

As the construction of the device has thus been described in detail, brief reference is now had to its use and modus operandi: By means of the lever 80, the frame 43 together with all of the parts supported thereon may be readily raised or lowered to clear the teeth 47 from the ground when transporting the machine from one place to another or to regulate the depth of operation of the teeth 47 in the soil, during operation of the machine. The clutch control lever 30 may also be readily actuated by the operator without the necessity of leaving his seat 13 to release the clutch when transporting the machine from one place to another or to bring the clutch into operation when the machine is to be operated on the surface. Likewise, the dump lever or crank lever 63 may also be readily actuated by the operator when on the seat 31 to cause dumping of the dump pan 56 and return of the same to its normal or receiving position. During operation of the machine on the surface, all of the operative parts of the machine are driven by power derived from operation of the rear ground wheels 13 on the surface and the teeth 47 will serve to harrow the ground and also gather all weeds, roots and the like from the soil and carry them up through the slots 48 of the rearwardly inclined runway 49 and leave them on the upper face of the runway 49 as the teeth 47 gradually leave the slots 48 and thus automatically clear themselves from the inclined runway 49 and before again passing downwardly for another operation in the soil. The transverse scraper blades 66 passing upwardly over the inclined runway 49 serve to carry the weeds, roots and the like delivered onto the inclined runway 49 upwardly over the same and deliver them to the dump pan 56, from which they may be readily dumped, as desired.

From the foregoing description taken in connection with the accompanying drawings, it will be manifest that a revolving harrow and weeder is provided that will fulfill all the necessary requirements of such a device but as many changes could be made in the above description and many apparently widely different embodiments of our invention may be constructed within the scope of the appended claims without departing from the spirit or scope thereof, it is intended that all matters contained in the said accompanying specification and drawings shall be interpreted as illustrative and not in a limitative or restrictive sense.

Having thus described our invention, what we claim as new and desire to secure by Letters Patent is:—

1. In a device of the character described, a wheeled frame, a vertically movable harrow mechanism of the endless belt type associated with the wheeled frame and operative in a horizontal plane, a fixedly mounted runway co-operating to remove weeds and the like from the harrow mechanism, a conveyor co-operatively associated with the runway, a weed receiving pan arranged at the rear of the runway and drive means mounted on the wheeled frame for operating the harrow mechanism.

2. In a device of the character described, a wheeled frame, a sub-frame, harrow mechanism of the endless belt type operatively mounted in the sub-frame and operative in a horizontal plane, a runway formed with a plurality of slots adapted to gradually remove weeds and the like from the harrow mechanism during operation, a weed receiving dump pan arranged at the rear of the runway, operating means for vertically raising and lowering the harrow mechanism in the wheeled frame, drive means associated with the wheeled frame for operating the harrow mechanism and clutch means for engaging and disengaging the drive means.

3. A device of the character described comprising, a wheeled frame, a sub-frame mounted for vertical movement in the wheeled frame, harrow mechanism of the endless belt type mounted and operative in a horizontal plane, a fixedly mounted runway extending over the harrow mechanism, a conveyor in the sub-frame mounted in superposed relation to the runway and adapted to conduct weeds and the like to the rear thereof, operable means for raising and lowering the sub-frame, drive means associated with the wheeled frame for operating the harrow mechanism and the conveyor and clutch means for engaging and disengaging the drive means.

4. A device of the character described comprising, a wheeled frame, a sub-frame mounted within the wheeled frame and adjustable vertically in a horizontal plane, toothed harrow mechanism of the endless belt type mounted in the sub-frame and normally operative in a horizontal plane, an inclined runway formed with longitudinal slots and extending over the harrow mechanism and adapted to gradually remove weeds and the like from the harrow teeth during operation, a conveyor member co-operating to carry weeds and the like to the rear of the runway, a tiltable weed receiving pan at the rear of the runway, drive means associated with the wheeled frame for operating the harrow mechanism and the conveyor and clutch means for engaging and disengaging the drive means.

WILLIAM TODORUK.
HARRY CHORNOBY.